Patented Apr. 11, 1933

1,903,598

UNITED STATES PATENT OFFICE

JOHANNES SCHEIBER, OF LEIPZIG, GERMANY, ASSIGNOR TO WALTER DUX, OF HANOVER, GERMANY

SHELLAC SUBSTITUTE

No Drawing. Application filed November 15, 1928, Serial No. 319,717, and in Germany November 21, 1927.

This invention relates to new shellac substitutes and to a process for manufacturing same.

The researches with respect to the pure resin of shellac have shown, that its essential compounds are formed by lactid-like combinations of aleuritinic-acid on one side and shellol-acid or similar acids on the other side. Aleuritinic-acid is known to be a trihydroxy-palmitinic acid, while shellol-acid is to be regarded as a hydroaromatic hydroxy-carboxylic acid, the structure of which is not yet known. By heating mixtures of these two acids, resin-like products are formed, which correspond in all their essential properties to the shellac resin itself.

Products of shellac-like character are also obtained by combining hydroxy- and poly-hydroxy-carboxylic fatty acids of all kind with hydrogenized aromatic hydroxy-carboxylic acids or oxidized resinolic acids, say hydroxy-abietinic acids.

For technical use, however, this method is not practical, because it is very difficult to produce suitable aliphatic or hydroaromatic hydroxy-carboxylic acids. Although for example it is easy, to transform castor-oil (or ricinioleic)-acid into trihydroxy-stearic-acid with a good yield by treating castor-oil-acid with a solution of permanganate, there results by employing this method for the commercial linseed-oil-acids, a mixture of different unsaturated fatty acids, not only a very poor yield of the corresponding polyhydroxy acids, but moreover a mixture of inconstant and always changing quality.

Furthermore the production of hydroaromatic hydroxy-carboxylic acids especially suited for this purpose is difficult or uneconomic or not uniform in quality, as for example the production of hydroxy-resinolic acids by permanganate-treatment of resinolic acids, like abietinic acid.

According to the present invention, the hydroxy- and polyhydroxy-carboxylic acids of an aliphatic or hydroaromatic character can be substituted by the corresponding halogenized derivatives, which may be obtained easily in quantitative yields by treating suitable unsaturated acids of an aliphatic or hydroaromatic nature with chlorine. Whilst by treating abietinic acid with permanganate only 70–80% of a hydroxy-abietinic acid product of always different composition is obtained, there are no difficulties, to obtain corresponding chlorinated products with a nearly theoretical yield. Very likely the same are the conditions in regard of mixtures of manifold unsaturated fatty-acids for example the linseed-oil-acids, which by treatment with even very dilute alkaline solutions of permanganate and at low temperatures are split to a great extent, while the addition of chlorine takes place without any difficulty.

These halogenized products may be obtained in different ways. The initial products may be subjected to direct chlorination, if desired in the presence of suitable diluting agents; they may be submitted to the action of chlorine in alkaline solutions. Or a solution of hypochlorite of soda may be added to the alkaline solutions of the respective acids and the chlorinated products then may be precipitated in the same way, as in chlorination by chlorine acting directly on alkaline solutions—by adding suitable acids, as for example dilute hydrochloric acid.

These chlorinated products—obtained in one way or an other—now may be combined with a suitable hydroxy-acid. If the preparation of any hydroxy-acid is of no great difficulty, this acid may be used as a desirable component, the other chlorinated component corresponding—following the nature of the used hydroxy-acid—or to the type of aleuritinic-acid or to the type of shellol-acid. For example it is advantageous to combine the easily obtainable trihydroxystearic acid with the products obtained by the action of chlorine on resinolic-acids. On the other side, the easily accessible products of hydroaromatic character obtained by hydrogenation of the corresponding aromatic hydroxy-carboxylic acids, are useful as components for the mixture of chlorinated linseed-oil-acids.

The combining of the aforenamed components takes place in the heat, whereby hydrochloric acid is split off. It is advisable to add suitable catalyzers as finely dispersed metals, anhydrous chlorides, alkali, alkaline earth, suitable oxides, carbonates, etc.

In order to more fully describe the invention, I will now proceed to give some specific examples thereof, it being understood, that I do not thereby intend to limit the invention to the particular proportions, combinations and ingredients given.

*Example 1*

50 parts trihydroxystearic-acid are heated in presence of 1 part anhydrous chloride of aluminium with 100 parts of a chlorinated ab:etinic-acid, which is obtained by introducing 25 parts of chlorine into an alkaline solution of 100 parts of colophony and by precipitating the product of reaction by a mineral acid, until the development of hydrochloric acid is finished.

The product of reaction obtained is a light coloured resin of a perfectly shellac-like quality.

*Example 2*

50 parts of the mixture of linseed-oil-acids are chlorinated in benzene solution at ordinary temperature, wherefore about 25 parts of chlorine are necessary. The mixture of the chlorinated acids thus obtained is heated with a benzene solution of 140 parts of oxy-cyclohexan-carboxylic-acid on a back-flow condenser, until the hydrochloric acid is split off, and the resulting shellac-like resin precipitates.

Generally it is not difficult to obtain the resin-products, if prepared as described above, free of hydrochloric acid or of halogen, that splits off easily, in some cases however it may be advisable to grind the product with hot water, it being easily possible to obtain resins with a melting-point higher than 100° C. These products can be boiled out with water without danger of conglutination. To secure absolutely neutral products, it is advisable to add small quantities of an alkali metal carbonate or other alkali to the water.

The new products obtained are resins of lactid-character. They are similar in a marked degree to the shellac-resin itself and show especially the following qualities: They are soluble in aliphatic alcohols and insoluble or little soluble in hydrocarbons and fatty oils; they are easily peptonized by weak alkalis, in particular by carbonates, ammonia and borax. They have a great ability of aggregation by heat and must be regarded in this respect as really perfect substitutes of the natural shellac resin. The quality of the resins can be changed in wide range for different purposes by suitable additions, as waxes, natural and artificial resins of all kind, esters of cellulose, plastifying agents, etc.

I wish it to be understood that I do not desire to be limited to the exact details of construction shown and described, for obvious modifications will occur to a person skilled in the art.

I claim:

1. A process for the manufacture of shellac substitutes which comprises combining hydroxy-carboxylic acids of an aliphatic nature and the products which are obtained by addition of halogen to resinolic acids by subjecting the mixture to the action of heat.

2. A process for the manufacture of shellac substitutes which comprises combining hydroxycarboxylic acids of an aliphatic nature and the products which are obtained by addition of chlorine to resinolic acids by subjecting the mixture to the action of heat.

3. A process for the manufacture of shellac substitutes which comprises combining hydroxy-carboxylic acids of an hydroaromatic nature and the products which are obtained by addition of halogen to resinolic acids by subjecting the mixture to the action of heat.

4. A process for the manufacture of shellac substitutes which comprises combining hydroxy-carboxylic acids of an hydroaromatic nature and the products which are obtained by addition of chlorine to resinolic acids by subjecting the mixture to the action of heat.

5. A process for the manufacture of shellac substitutes which comprises combining hydroxy-carboxylic acids of an aliphatic nature and the products which are obtained by addition of halogen to unsaturated fatty acids by subjecting the mixture to the action of heat.

6. A process for the manufacture of shellac substitutes which comprises combining hydroxy-carboxylic acids of an aliphatic nature and the products which are obtained by addition of chlorine to unsaturated fatty acids by subjecting the mixture to the action of heat.

7. A process for the manufacture of shellac substitutes which comprises combining hydroxy-carboxylic acids of an hydroaromatic nature and the products which are obtained by addition of halogen to unsaturated fatty acids by subjecting the mixture to the action of heat.

8. A process for the manufacture of shellac substitutes which comprises combining hydroxy-carboxylic acids of an hydroaromatic nature and the products which are obtained by addition of chlorine to unsaturated fatty acids by subjecting the mixture to the action of heat.

9. A resin of lactid character produced by combining polyhydroxy-carboxylic acids of an aliphatic nature and the products which are obtained by addition of halogen to resinolic acids by subjecting the mixture to the action of heat.

10. A resin of lactid character produced by combining hydroxy-carboxylic acids of an hydroaromatic nature and the products which are obtained by addition of halogen to resinolic acids by subjecting the mixture to the action of heat.

11. A resin of lactid character produced by combining polyhydroxycarboxylic acids of an aliphatic nature and the products which are obtained by addition of halogen to unsaturated fatty acids by subjecting the mixture to the action of heat.

12. A resin of lactid character produced by combining hydroxy-carboxylic acids of an hydroaromatic nature and the products which are obtained by addition of halogen to unsaturated fatty acids by subjecting the mixture to the action of heat.

In testimony whereof I affix my signature.

JOHANNES SCHEIBER.